United States Patent [19]

Dabbaghi et al.

[11] Patent Number: 5,282,243

[45] Date of Patent: Jan. 25, 1994

[54] RECORDING OF AUTOMATIC NUMBER IDENTIFICATION TO IDENTIFY LOST CUSTOMERS

[75] Inventors: Hassan Dabbaghi, Atlantic Highlands; Robert Finberg, Flemington; Albert Friedes, East Brunswick, all of N.J.; Lisa C. Giulianelli, Austin, Tex.; Angela R. Gore, Ocean, N.J.; Nadine Grasty, Warren, N.J.; Susan E. Grove, Summit, N.J.; Carlos Perea, Somerset, N.J.; Paramdeep S. Sahni, Marlboro, N.J.; Susan M. Zoccolillo, Howell, N.J.

[73] Assignee: AT&T Bell Laboratories, Murray Hill, N.J.

[21] Appl. No.: 973,195

[22] Filed: Nov. 6, 1992

Related U.S. Application Data

[63] Continuation of Ser. No. 548,321, Jul. 3, 1990, abandoned.

[51] Int. Cl.$^5$ .............................................. H04M 3/42
[52] U.S. Cl. .................................... 379/201; 379/142; 379/211
[58] Field of Search ............... 379/265, 266, 211, 212, 379/221, 201, 209, 207, 142

[56] References Cited

U.S. PATENT DOCUMENTS

| | | | |
|---|---|---|---|
| 4,400,587 | 8/1983 | Taylor et al. | 379/266 |
| 4,682,354 | 7/1987 | Vanacore | 379/266 |
| 4,800,583 | 1/1989 | Theis | 379/266 |
| 4,942,598 | 7/1990 | Davis | 379/211 |
| 5,040,208 | 8/1991 | Jolissaint | 379/209 |
| 5,048,075 | 9/1991 | Katz | 379/97 |

OTHER PUBLICATIONS

AT&T Bell labs Record: "LASS:Putting the telephone customer in charge" by Hirschman et al., May 1985.
Bell Atlantic advertizement "Return Call" Feb. 1990.
Inbound/Outbound Magazine "Beyond ISDN Theory..." by Andrew Waite, Dec. 1989.

Primary Examiner—James L. Dwyer
Assistant Examiner—Ahmad F. Matar
Attorney, Agent, or Firm—Henry T. Brendzel

[57] ABSTRACT

In order to enable an "800" telephone number business subscriber to identify customers, whose incoming telephone calls were blocked, the Automatic Number Identification (ANI) of these calling customer is automatically recorded within the telecommunications network for later access by the business subscriber.

10 Claims, 4 Drawing Sheets

FIG. 1 "PRIOR ART"

RECORDING OF AUTOMATIC NUMBER IDENTIFICATION TO IDENTIFY LOST CUSTOMERS

This application is a continuation of application Ser. No. 07/548,321, filed on Jul. 3, 1990 now abandoned.

BACKGROUND OF THE INVENTION

The present invention relates to telecommunications systems and particularly to "800" telecommunications networks.

The number of customer contacts that a business experiences may directly affect that business's market share and revenues. As a result, a business may look to different methods to facilitate customer contacts, such as utilizing currently available telecommunication services. For example, some businesses subscribe to an "800" telecommunication network service in order to provide accessibility to their customers and thus increase the number of their customer contacts. An "800" service allows businesses to offer "toll-free" communications to customers. For example, a customer can dial an "800" telephone number, at no-charge, to contact a particular business in order to inquire about a specific product, place an order, or even request a service, all from the convenience of his or her residence or office.

Typically a business which subscribes to an "800" service is characterized as engaging in a form of "inbound telemarketing", i.e., when contact with a business representative, or agent, is initiated by a customer dialing the "800" telephone number. In-bound telemarketing services are usually engineered by a business in order to provide an acceptable grade of service for the incoming "800" customer telephone calls. For example, a business will order a specific type of incoming telecommunication facility which is comprised of a number of trunks (e.g. ground start trunks, loop start trunks, ISDN trunks etc.) from the service provider based on their expected incoming telephone call volumes. In addition, a business will determine the number of agents needed to answer, or provide "call receipt", for the incoming telephone calls. As long as the number of agents is equal to the number of trunks, every incoming telephone call can be answered, but when the number of agents is less than the number of trunks, customers may have to wait for their telephone calls to be answered. As a result, in order to make the customer's wait more bearable some businesses improve their call receipt operation by utilizing sophisticated premise equipment. For example, a large business may actually terminate the telecommunication facilities from the service provider in their own on-premise switching system, or Private Branch Exchange (PBX), which provides the business with additional features for handling incoming calls. With such an installation, an incoming telephone call can still be answered if all agents are busy, but the calling customer may first hear an announcement to "Please hold, all agents are busy . . . " to encourage the customer to wait for service.

However, even if a business engineers its in-bound telemarketing service to provide for generally efficient call-receipt of incoming customer telephone calls, there is still a problem during "peak periods", such as during either sale promotions or holiday weekends. During these peak periods, the number of incoming customer telephone calls may not only exceed the number of call-receipt agents available to answer a call, but may also physically exceed the capacity of the incoming telecommunication facilities subscribed to by the business. Disadvantageously, these additional customer calls are lost. Customers calling in only hear a busy signal and since their call is "not answered" i.e. "blocked" from completion, they must redial the telephone number to attempt contact with the business. While customers are not charged for such calls, re-dialing can be a frustrating experience and, as a result, not all customers will redial. Since a business can only identify the customers who actually make contact with the business, the customers who give up, whose identities are unknown, represent lost customer contacts which affects sales of services or products. Even if a business has on-premise equipment, such as a PBX, this equipment, once all the incoming facilities are busy, cannot detect if additional calls are being blocked from completion, so, from the business's point of view these additional customers are, again, lost.

SUMMARY OF THE INVENTION

In accordance with the invention, we have realized a method and apparatus for use in a telecommunication network which allows a business to determine the identity of a calling customer whose telephone call was not answered, i.e. blocked from completion. Specifically, when a calling customer's telephone call is blocked, the callback telephone number of the calling customer is recorded within the telecommunication network. A business can later access the recorded information to determine the telephone number of the calling customer who could not complete his or her telephone call.

In accordance with a feature of the invention, if all incoming telecommunication facilities to a business are busy, any additional calls will have their Automatic Number Identification (ANI) recorded within the telecommunication network.

In accordance with another feature of the invention, the calling customer is able to leave additional information for the called business such as a different customer callback telephone number or a brief voice message.

DETAILED DESCRIPTION

The number of customer contacts that a business experiences may directly affect that business's market share and revenues. As a result, a business may look to different methods to facilitate customer contacts, such as utilizing currently available telecommunication services. One such representative telecommunication service is the MEGACOM ® 800 (M800) service from AT&T. By subscribing to the M800 service, a business offers its customers the ability to dial, at no-charge (or toll-free), an "800" telephone number to access the business. This allows a customer to inquire about a specific product, place an order, or even request a service from the convenience of his or her residence or office. As a consequence, by providing easier access for its customers, a business may be able to create more customer contacts with a resulting positive effect on revenues.

Figure 1:
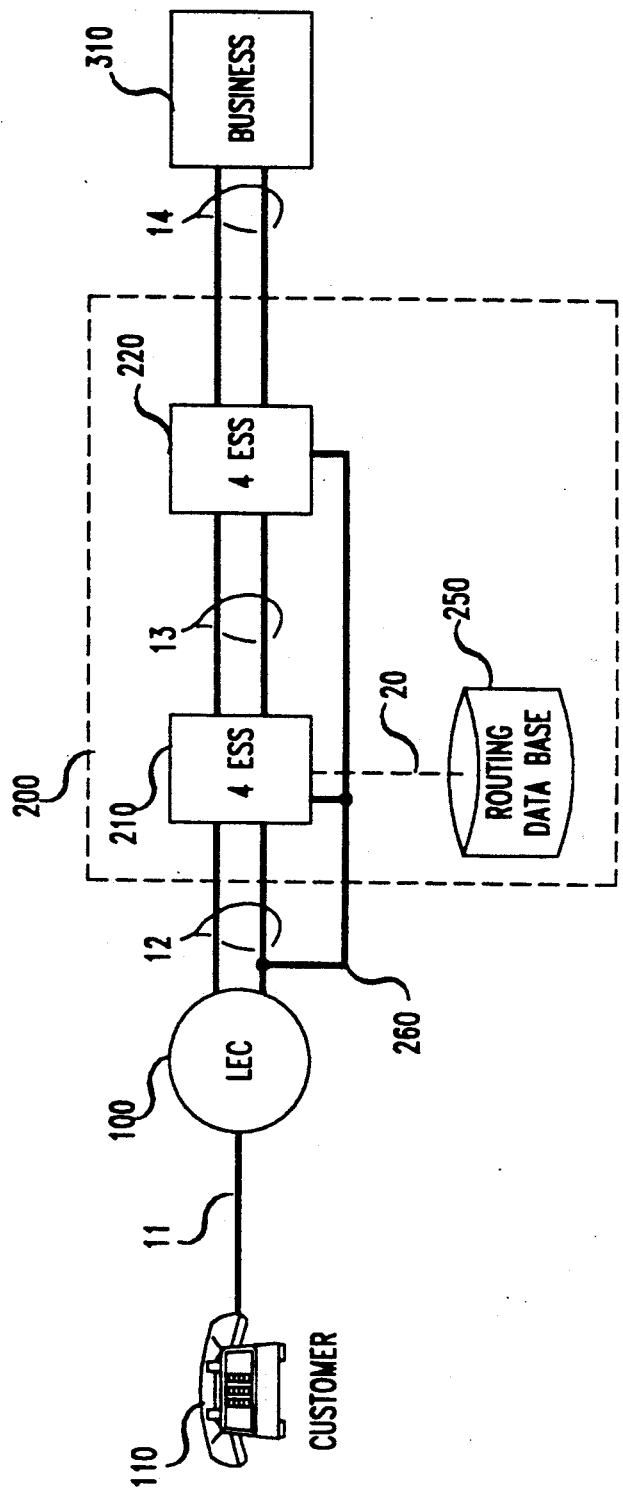
FIG. 1 is a block diagram of an illustrative telecommunications system in which a representative "800" service is provided.

A representative telecommunications system, in which the above mentioned M800 service is provided to a subscribing business, is illustrated in FIG. 1. The telecommunication system of FIG. 1 is comprised of well-known technologies, and references to relevant illustrative technical material are included hereinbelow. In addition, it is assumed the nomenclature of a "telephone call" is understood to represent any of the well-known methods, processes, and technologies used in telecommunications for supporting a voice communication between a starting point, the calling party, and the destination, the called party.

Telecommunications network 200 is illustratively comprised of a plurality of stored-program-controlled switching systems, herein represented by 4 ESS ™ digital switches 210 and 220 available from AT&T. The 4 ESS digital switch is described in detail in the *Bell System Technical Journal*, Vol. 56, No. 7 September, 1977, and Vol. 60, No. 6, Part 2, July-August, 1981. For the purposes of this example, 4 ESS switching systems 210 and 220 are representative of the originating and terminating points, respectively, of network 200. (Examples of network architecture can be found in the *AT&T Technical Journal*, Vol. 66, Iss. 3, May-June, 1987.) An illustrative telephone call will enter network 200, through switch 210, the originating point of the telephone call in the network. Switch 210 will access network routing database 250 in a well-known way for routing information in order to route the telephone call to switch 220 through representative path 13. Path 13 may include other network stored-program-control switches and represents typical network interconnecting trunk facilities through which an illustrative telephone call may be routed. Telecommunications network 200 serves a plurality of local exchange carriers (LECs), as represented by LEC 100. LEC 100 is also representative of a stored-program-control switching system technology such as that described in *The Bell System Technical Journal*, Vol. 56, No. 2, February, 1977, and Vol. 64, No. 6, Part 2, July-August, 1987. LEC 100 is connected through represenative path 12 to 4 ESS 210. Path 12 is representative of typical network access facilities, such as trunks and other stored-program-control switches, as mentioned herein above, through which the telephone call is routed to network 200. LEC 100, in turn, serves a plurality of telephone subscribers, herein illustratively represented by customer telephone 110, connected via analog line facility 11 (e.g. a loop-start line). Customer telephone 110 is assumed to be, and what is know in the art as, a "touch-tone" telephone for the purposes of this example (i.e., not a rotary dial telephone). Network 200 also serves a plurality of businesses which are illustratively represented by business 310 connected to 4 ESS switch 220 over trunk facility 14, illustratively a "primary rate interface" (PRI) Intergrated Services Digital Network (ISDN) facility. ISDN technology is described in the *AT&T Technical Journal*, Vol. 66, Iss. 3, May-June, 1987, and, Vol. 65, Iss. 1, January-February, 1986. Trunk facility 14 represents the number of ISDN trunks subscribed to by business 310.

In order to provide the ability to route an illustrative telephone call from customer 110 to business 310, the telecommunication system of FIG. 1 also includes well-known Common Channel Signaling (CCS) system 260 for transferring "control information" such as billing, routing, and supervisory information messages between the representative stored-program switching systems shown in FIG. 1. A typical CCS system is described in the *Bell System Technical Journal*, Vol. 57, No. 2, February, 1978, and Vol. 61, No. 7, September, 1982, and in the *AT&T Technical Journal*, Vol. 66, Iss. 3, May-June, 1987, and Vol. 65, Iss. 1, January-February, 1986. For the purpose of this example, it is assumed that the telecommunication system of FIG. 1 conforms to CCS7 signaling and supports ISDN applications as defined in *AT&T Networks ISDN Primary Rate Interface and Special Applications Specification*, Technical Reference 41459, April, 1989. In addition, it is assumed that the switching systems, and connecting trunk facilities, can supply the well-known Automatic Number Identification (ANI) of the calling customer within this control information. A telephone signaling protocol for supplying ANI from a LEC to a network switching system is described in U.S. Pat. No. 4,555,594, issued Nov. 26, 1985, to Friedes, et al. Finally, for the purposes of the description hereinbelow, a telephone call will be understood to include the above mentioned control information, of which the relevant parts herein are the ANI and the called party information.

As is well known in the art, a customer can originate a typical "800" telephone call by lifting the handset on telephone 110, thereby being connected to LEC 100, and then dialing a predetermined "800" number which corresponds to business 310. LEC 100 will receive the dialed digits (touch-tones) from telephone 110 and will route the telephone call to 4 ESS switching system 210. 4 ESS switch 210 receives the telephone call from LEC 100 and queries network database 250 for routing information. 4 ESS switch 210 uses the routing information to route the telephone call over representative path 13 to terminating 4 ESS 220. Terminating 4 ESS 220 checks the status of ISDN facility 14 to determine if any idle, i.e. non-busy, trunks exist to business 310. Upon identifying an idle trunk, terminating 4 ESS 220 will route the telephone call to business 310. Business 310 completes the call from customer telephone 110 upon answering the incoming telephone call.

In offering an "800" service to their customers, a business can be characterized as engaging in a form of "in-bound telemarketing", i.e. when contact with a business representative, or agent, is initiated by a customer calling the "800" telephone number. In-bound telemarketing services are usually engineered by the business to meet their expected incoming call volumes such as ordering a specific number of trunks of a specific type of trunk facility (e.g. ground-start trunks, ISDN trunks) from their service provider. In this example, trunk facility 14 is representative of the number of ISDN trunks needed by business 310 to handle the expected call volume. In addition, a business will staff the "call-receipt" positions with agents to answer any incoming telephone calls. (An overview of typical telemarketing applications and architectures is described in *AT&T Technology*, Vol. 2, No. 3, 1987.) However, even with careful service engineering, there may still be times, such as during "peak periods", e.g., sales promotions, where the number of incoming telephone calls will be greater than the capacity of the facilities subscribed to by the business. In this case, terminating 4 ESS 220, in attempting to place the customer telephone call from telephone 110, will find no idle trunks and will send a subscriber busy message, using the well-known ISDN UP-routing, back to 4 ESS 210. 4ESS 210 will pass the busy signal back to LEC 100 as in the prior art. As a result, the customer at telephone 110 will hear a "busy" signal, and will have to "hang-up" and redial the "800" number to try to contact business 310 again. However, due to the inconvenience of having to re-initiate their calls any number of times (depending on the volume of incoming telephone calls to business 310), there is no guarantee that these customers, once their telephone calls are not answered i.e. blocked from completion, will continue to redial the "800" number to contact business 310. Since a business can only identify the customers who actually contact the business, the customers who give up, whose identities are unknown, represent lost customer contacts which affect sales of services or products. As a result, business 310 is potentially losing additional revenues from these blocked customers.

In accordance with the invention, we have realized a method and apparatus for use in a telecommunication network which allows a business to determine the identity of a calling customer whose telephone call was not answered, i.e. blocked from completion. Specifically, when a calling customer's telephone call is blocked, the callback telephone number of the calling customer, herein represented as the Automatic Number Identification (ANI) of the calling party, is recorded within the telecommunications network. As a result, a business can later access the recorded information to determine the telephone number of the calling customer who could not complete their telephone call. An illustrative telecommunication system embodying the principles of the invention is shown in FIG. 2.

Figure 2:
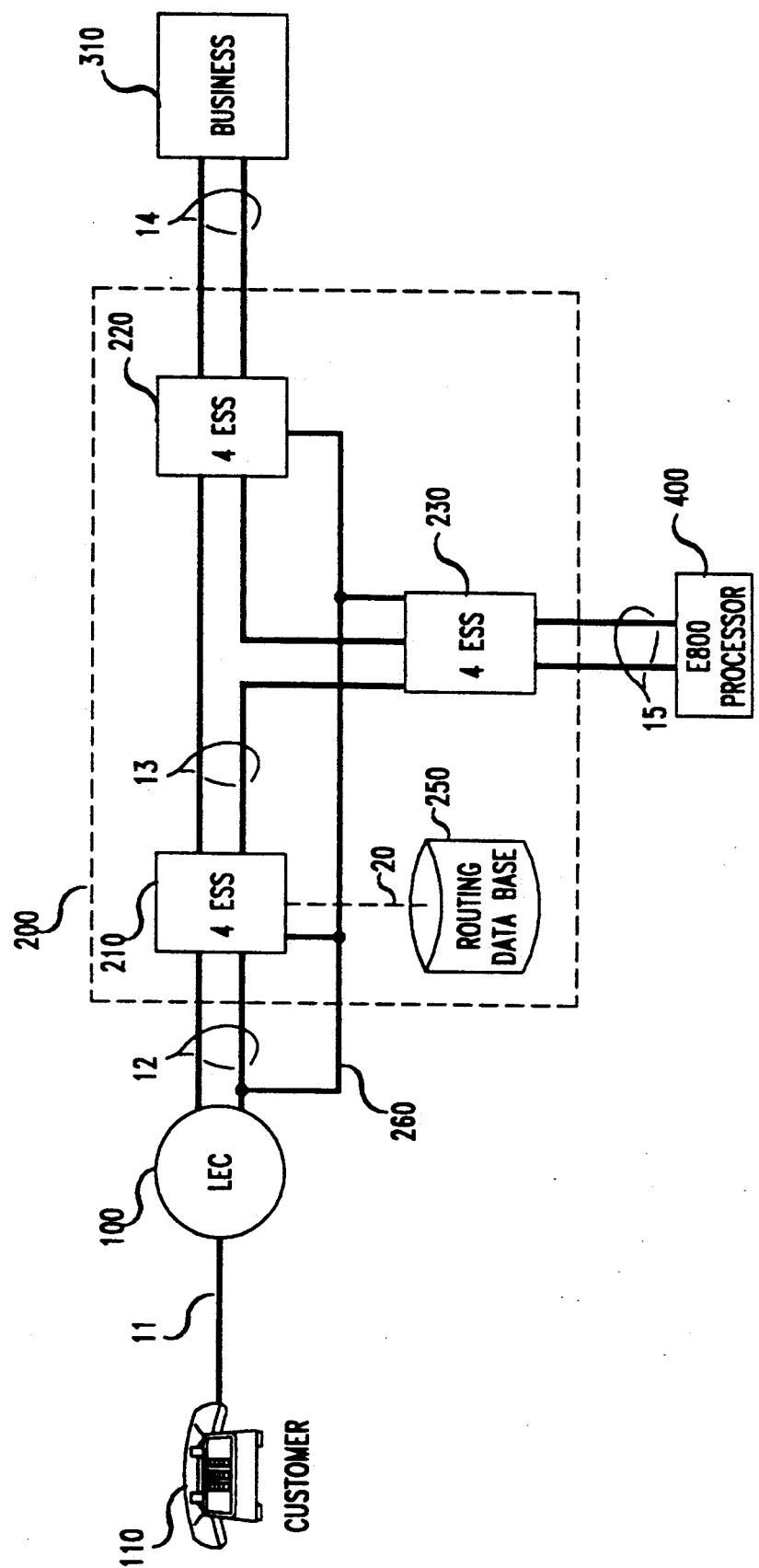
FIG. 2 is a block diagram of an illustrative telecommunications system embodying the principles of the invention.

FIG. 2 is identical to FIG. 1 except for the addition of 4 ESS switch 230 and enhanced 800 (E800) processor 400. 4 ESS switch 230 is a part of network 200, previously included in path 13 of FIG. 1, and is representative of an additional predetermined exit point from network 200. 4 ESS switch 230 is connected to E800 processor 400 over PRI ISDN trunk facility 15. E800 processor 400 will be discussed in detail hereinbelow. The service disclosed herein in accordance with the invention will be termed the "ANI recording service". An "800" subscriber business which chooses to additionally subscribe to the ANI recording service is identified as such in the network routing database by adding an identifying code to the routing information already stored for the particular business. For example, the identifying code can be additional routing information to route a blocked customer telephone call to E800 processor 400.

Figure 3:
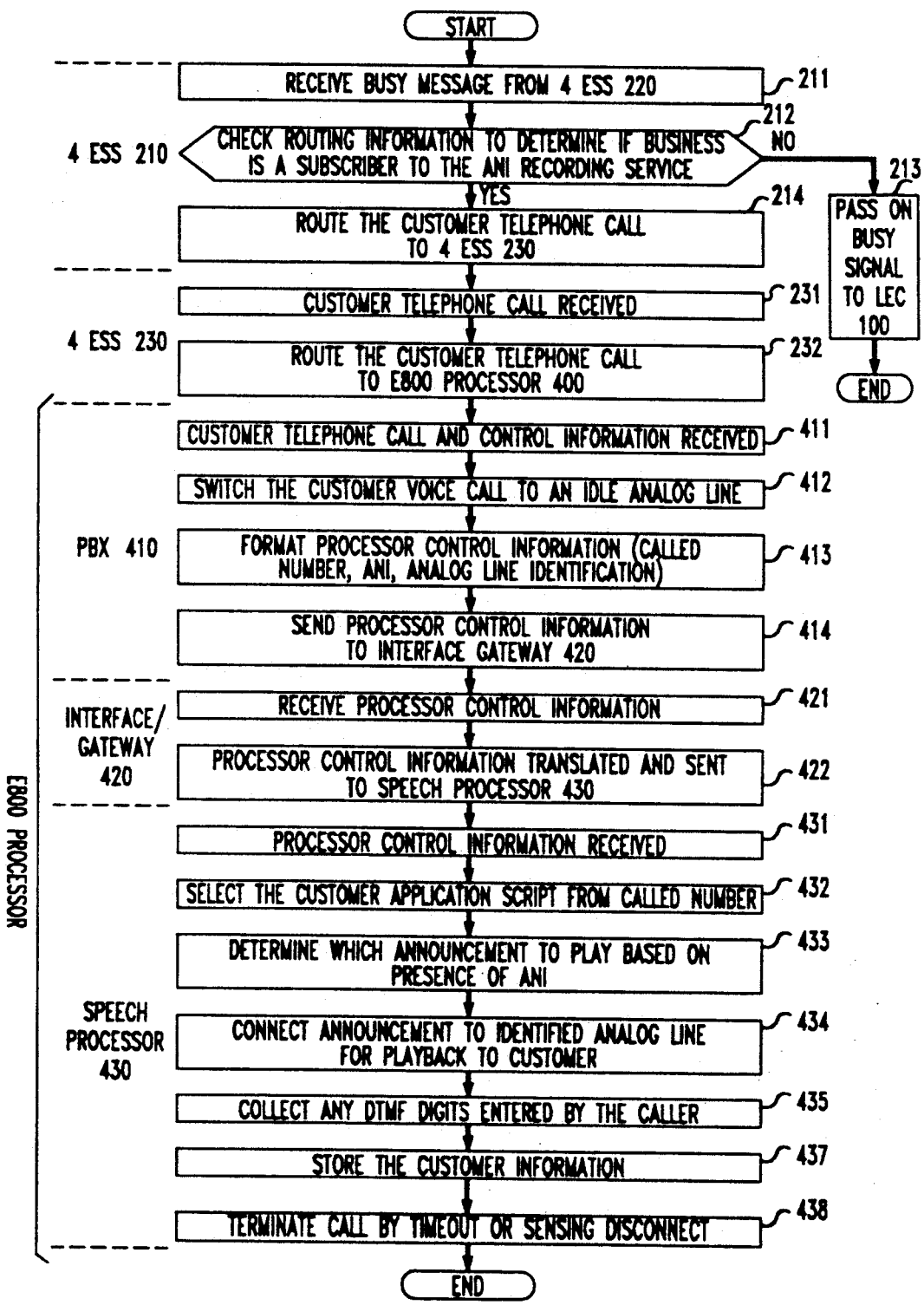
FIG. 3 is an illustrative flow diagram of a method, embodying the principles of the invention, for processing a customer's blocked telephone call to record the customer callback telephone number.

As before, a customer at telephone 110, initiates a telephone call with LEC 100 and dials the "800" number of business 310. The telephone call is switched through LEC 100, through path 12, to originating 4 ESS switch 210. 4 ESS switch 210 receives the telephone call from LEC 110 and queries network database 250 for routing information. 4 ESS 210 uses the routing information to route the telephone call and control information to terminating 4 ESS 220. Terminating 4 ESS 220 receives the customer's telephone call and searches all the trunk facilities assigned to business 310 for an idle trunk. If an idle trunk is found then as before, the customer's telephone call is delivered to business 310. However, if an idle trunk is not found, i.e. all the trunks are busy and the customer's call is blocked, 4 ESS 220 sends a subscriber busy message, as in the prior art, using ISDN UP-routing, back to 4 ESS 210. At this point, in order to facilitate understanding the inventive concept, reference can also be made to FIG. 3 which represents an illustrative method used herein to process the customer telephone call.

On receiving the subscriber busy message (FIG. 3, block 211) 4 ESS 210 checks the routing information from network database 250. If the routing information does not identify business 310 as a subscriber to the ANI recording service, 4 ESS 210 passes on the busy signal to LEC 100 as in the prior art (blocks 212 and 213). However, if the routing information identifies Business 310 as a subscriber to the ANI recording service, 4 ESS 210 will send the telephone call to E800 processor 400 by routing the telephone call to 4 ESS 230 (blocks 212 and 214).

4 ESS switch 230 receives the customer's telephone call (block 231) and routes the telephone call to E800 processor 400 (block 232).

Figure 4:
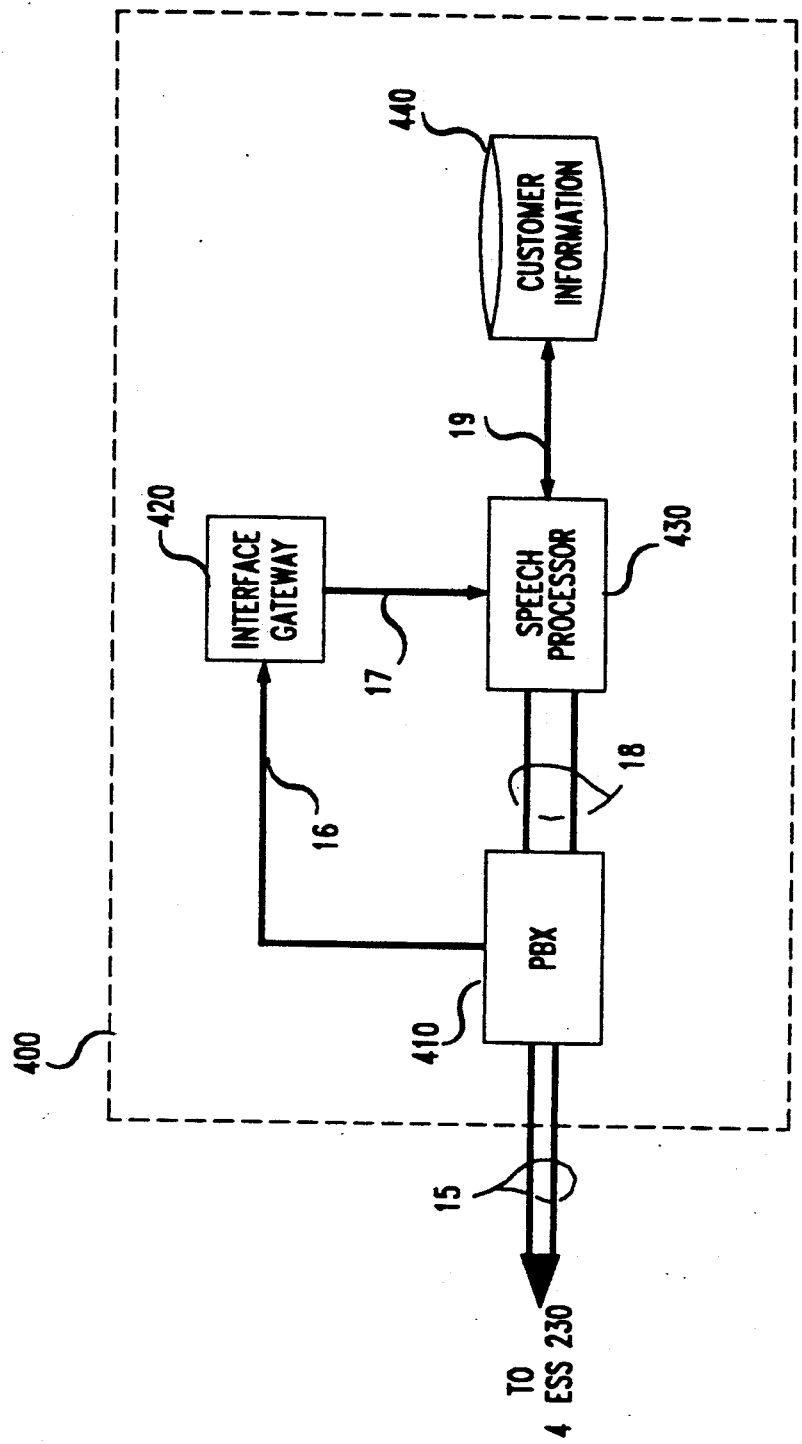
FIG. 4 is a block diagram of an illustrative processing complex, embodying the principles of the invention, for recording the customer callback telephone number.

FIG. 4 illustratively represents E800 processor 400, which includes Private Branch Exchange (PBX) 410, the latter is a stored-program-controlled switch, and is illustratively an AT&T System 85 digital PBX connected to 4 ESS switch 230 over ISDN trunk facility 15. PBX 410 is also connected within E800 processor 400, to interface gateway 420 over data connection 16 and to speech processor 430 over analog facility 18, which is composed of any number of analog lines. On receiving the customer telephone call (block 411), which includes the customer's voice call and control information, PBX 410 switches the customer's voice call to an idle line in analog facility 18 (block 412) and reformats the control information. The control information is reformatted to include: the called number (i.e. the originally dialed telephone number of business 310), ANI of the calling customer, and the line identification (i.e. which one of the analog lines 18 the customer telephone voice call is now connected to) (block 413). The reformatted information is now called the processor control information. The processor control information is transmitted to interface gateway 420 over data connection 16 (block 414). Data connection 16 is a typical synchronous serial data connection, such as the Electronic Industries Association (EIA) RS-232C interface, on which the well-known X.25 protocol is used for transfer of the processor control information to interface gateway 420.

Interface gateway 420 receives this information (block 421) and translates the information into a protocol acceptable by speech processor 430 (block 422). In this example, interface gateway 420 is a general purpose computer such as the AT&T 3B/400 used as a protocol interface between PBX 410 and speech processor 430. (The AT&T 3B computers are generally described in *AT&T Technology Report*, Vol. 3, No. 2 and No. 3, 1988.) Information is sent to speech processor 430 over data connection 17 which is representative of a typical asynchronous EIA RS-232 data interface.

Speech processor 430 is illustratively a Conversant ® System from AT&T described in the *AT&T Technical Journal*, Vol. 65, Iss. 5, September–October, 1986. Speech processor 430 is capable of script-based transactions, i.e. the system is user programmable, and, as used herein, will run different application scripts depending on the particular processor control information received from interface gateway 420. The use of a script-based processor behind a PBX as a method of enhancing telephone services is known in the art and is described in U.S. Pat. No. 4,878,240, issued Oct. 31, 1989, to Lin, et al. Speech processor 430 receives the processor control information from interface gateway 420 (block 431). The response of speech processor 430 to the calling customer is determined by the processor control information. Speech processor 430 selects the particular customer application script to be used depending on the called number (block 432). In this illustration, the application script associated with business 310 is chosen.

Although it has been tacitly assumed to this point that ANI is available, in some situations a customer's telephone call may originate from a LEC which cannot supply ANI information. Therefore speech processor 430 determines at this point which announcement to play depending on the presence of ANI information (block 433). Finally, the announcement is played back to the customer by connecting the announcement to the analog line identified in the processor control information (block 434).

The playing of the announcement by speech processor 430 prompts the caller for information. For example if ANI is available, then the following illustrative announcement is played: "This is XYZ Company, we are unavailable to take your call right now but if you would like us to call you back, press "1". If you would like to leave another telephone number to be used to call you back please enter the area code and number. If you do not wish to be called back please enter "0" or just hang up.

If the customer's ANI is not available the following alternate illustrative announcement is played: "This is XYZ Company, we are unavailable to take your call right now but if you would like us to call you back please enter your area code and number. If you do not wish to be called back please enter "0" or just hang up.

After the messages are played, as described hereinabove, speech processor 430 collects any customer input, illustrated here as touch-tones in response to one of the above played, messages (block 435). Speech processor 430 then stores the following illustrative customer information in data base 440: the time of the call, the called number, and customer ANI/or customer input telephone number (block 437), and terminates the call by waiting for a predetermined amount of time or by detecting a disconnect on the analog line (i.e. that the customer has terminated the telephone call or hung up) (block 438). Thus, the customer's identity has been illustratively stored within the telecommunication network.

As is known in the art, business 310 can access the customer information, in data base 440, in any number of well-known ways. For example, by initiating a telephone call to speech processor 430 using a predetermined number to gain access to the customer information, by having a private line data facility to E800 processor 400, or by having the speech processor 430 initiate a telephone call to business 310 at a later time.

From the above description, it can be appreciated that numerous enhancements can be made to improve the service disclosed herein to the customer. For example, although the illustrative description herein details detection of a busy condition on the facilities connected to a business, it can be easily extended to customer telephone calls which are blocked from completion due to a ring-no-answer situation. Businesses during out-of-hours, such as evenings and weekends, can use such a service to route all incoming telephone calls to the ANI recording service in order to record any customer inquiries without having to employ staff to answer the telephone calls. Also a customer can be allowed to store a voice message in addition to his or her callback telephone number. Further, though it has been assumed the customer is using a touch-tone telephone, additional well-known speech processing techniques (e.g. voice recording, speech recognition) can be used in order to take voice information from a customer which would also allow the use of a rotary dial telephone.

Thus it will be apparent that the foregoing merely illustrates the principles of the invention. For example, although a customer's identifying ANI information was routed over a simple network configuration using ISDN facilities and stored in a processor complex, it can be appreciated that any other customer-identifying information compatible with a network configuration and CCS scheme can be stored to achieve the same result. Additionally, the network configuration used is merely representative, and other network configurations and architectures can be used. For example, other connecting facilities to the business can be used such as a TI connection. Finally, the stored-program-control switches shown were merely to demonstrate the principles of the invention. For example, the detection and transfer of a customer telephone call that was not answered can be done by another 4 ESS switch through which the call is routed, the functionality between the three 4 ESS switches can be included in one 4 ESS switch, and it is not required that the business customer have a PBX. It will thus be appreciated that those skilled in the art will be able to devise numerous arrangements, which, although not explicitly shown or described herein, embody the principles of the invention and are thus within its spirit and scope.

We claim:

1. Apparatus for providing a telecommunications network service when a calling party's telephone call to a called party is blocked, the apparatus comprising:

a telecommunications network comprising an originating stored-program-control switch, a terminating stored-program-control switch, and a data base means for storing information that represents when the called party is a subscriber to the telecommunications network service, where the calling party's telephone call enters the telecommunications network at the originating switch, and the terminating switch provides a number of telecommunications facilities to telephone equipment of the called party and provides a busy message to the originating switch if all of the number of telecommunications facilities are busy; and processing means coupled to the originating switch for receiving the calling party telephone call and for recording a calling party call back telephone number whereby the telecommunication network service identifies the calling party whose telephone call to the called party is blocked;

where the originating switch is responsive to the busy message from the terminating switch and accesses the data base means through a facility of the telecommunications network to determine when the called party is a subscriber to the telecommunications network service and, when it is, routes the calling party telephone call to the processing means in such a way that the calling party telephone call does not pass through the terminating switch.

2. The apparatus of claim 1 wherein the telecommunications network provides toll-free telephone call service between the calling party and the called party, and the calling party call back telephone number is an automatic number identification of the calling party.

3. Apparatus of claim 1 wherein the processing means is further comprised of:
- means responsive to the calling party telephone call for providing processor control information in a first format and for providing the calling party's voice call;
- interface gateway means for receiving the processor control information in the first format and for providing the processor control information in a second format; and
- speech processor means responsive to the processor control information in the second format and the calling party's voice call for recording the calling party's call back telephone number.

4. The apparatus of claim 3 wherein the means responsive to the calling party telephone call provides the calling party's voice call on one of a plurality of analog lines.

5. The apparatus of claim 4 wherein the processor control information includes the called number of the called party and an identification of the one analog line.

6. The apparatus of claim 3 wherein the speech processor means records touch-tone responses of the calling party.

7. The apparatus of claim 3 wherein the speech processor means records a voice response of the calling party.

8. Apparatus for providing a blocked-call service to a called party when a calling party's telephone call to the called party is blocked, the apparatus comprising:
- an originating stored-program-control switch for receiving the calling party's telephone call;
- a terminating stored-program-control switch for providing communications facilities to the called party and for providing a busy message when all the facilities to the called party are busy;
- data base means for storing blocked-call service subscriber information that is coupled to the originating stored-program-control switch through a plurality of other stored-program-control switches; and
- processor means for recording calling party information;
- where the originating switch accesses the data base means in response to the busy message and, when the called party is a subscriber to the blocked-call service, transfers the calling party's telephone call to the processor means in such a way that it does not pass through the terminating switch.

9. The apparatus of claim 8 wherein the processor means includes:
- a third stored-program-control switch for receiving the transferred telephone call; and
- speech processing means for answering the transferred telephone call to record the calling party's information.

10. A method for providing a blocked-call service to a called party when a calling party's telephone call to the called party is blocked, the method comprising the steps of:
- receiving in a first stored-program-control switch the calling party's telephone call;
- detecting in a second stored-program-control switch that a number of facilities provided by the second stored-program-control switch to the called party are busy;
- sending from the second stored-program-control switch to the first stored-program-control switch a busy message, which represents that the calling party's telephone call to the called party is blocked;
- receiving the busy message in the first stored-program-control switch;
- sending a query to a data base from the first stored-program-control switch to retrieve blocked-call service subscriber information about the called party where the query and the subscriber information are respectively provided to, and received from, a telecommunications facility of a telecommunications network;
- transferring the calling party's telephone call when the called party is a subscriber to the blocked-call service from the first stored-program-control switch to a processor in such a way that the calling party's telephone call does not pass through the second stored-program-control switch; and
- recording in the processor calling party information.

* * * * *